(12) United States Patent
Van Well et al.

(10) Patent No.: US 8,380,336 B2
(45) Date of Patent: Feb. 19, 2013

(54) METHOD FOR INDIVIDUAL TRACKING OF METALLIC HOLLOW BODIES

(75) Inventors: Dirk Van Well, Herne (DE); Manfred Achterkamp, Bottrop (DE); Michael Eichler, Nettetal (DE)

(73) Assignee: V & M Deutschland GmbH, Düsseldorf (DE)

( * ) Notice: Subject to any disclaimer, the term of this patent is extended or adjusted under 35 U.S.C. 154(b) by 164 days.

(21) Appl. No.: 13/001,115

(22) PCT Filed: Jun. 19, 2009

(86) PCT No.: PCT/DE2009/000866
§ 371 (c)(1),
(2), (4) Date: Mar. 22, 2011

(87) PCT Pub. No.: WO2009/155901
PCT Pub. Date: Dec. 30, 2009

(65) Prior Publication Data
US 2011/0218661 A1 Sep. 8, 2011

(30) Foreign Application Priority Data
Jun. 26, 2008 (DE) .......................... 10 2008 030 183

(51) Int. Cl.
*G06K 7/00* (2006.01)
*G06K 7/10* (2006.01)
*G06K 9/18* (2006.01)
*G06K 19/06* (2006.01)
*G06F 19/00* (2011.01)

(52) U.S. Cl. ... 700/115; 235/439; 235/456; 235/462.09; 235/462.15; 235/494

(58) Field of Classification Search .................. 700/115; 235/439, 456, 462.09, 462.15
See application file for complete search history.

(56) References Cited

U.S. PATENT DOCUMENTS

| | | | | |
|---|---|---|---|---|
| 4,202,490 A | * | 5/1980 | Gunkel et al. | 235/449 |
| 4,822,987 A | * | 4/1989 | Goldenfield et al. | 235/487 |
| 5,481,100 A | * | 1/1996 | Terauchi | 235/494 |
| 6,032,861 A | * | 3/2000 | Lemelson et al. | 235/456 |
| 7,587,923 B1 | * | 9/2009 | Garza | 72/367.1 |
| 2012/0126008 A1 | * | 5/2012 | Binmore | 235/439 |

FOREIGN PATENT DOCUMENTS

| | | |
|---|---|---|
| DE | 195 05 513 | 8/1996 |
| DE | 102004051124 | 12/2005 |
| FR | 2 675 291 | 10/1992 |

* cited by examiner

*Primary Examiner* — Ronald Hartman, Jr.
(74) *Attorney, Agent, or Firm* — Henry M Feiereisen LLC

(57) ABSTRACT

The invention relates to a method for the individual tracking of metallic hollow bodies, in particular hot-fabricated steel tubes, wherein following a final step of hot-work the individual tube is provided with a distinctive identification on the tube circumference, which is read in the feed region to the subsequent manufacturing or test stations automatically as a video image during transport and independently from the direction of transport. According to the invention, the labeling of the tube circumference is carried out in at least two segment-like sections, the tube circumference being divided, wherein the labeling is carried out in segments with a rotation of less than 360 DEG of the numbering unit and the segments comprise an axial offset relative to the longitudinal axis of the tube, which is greater than the width of the data matrix code.

12 Claims, 2 Drawing Sheets

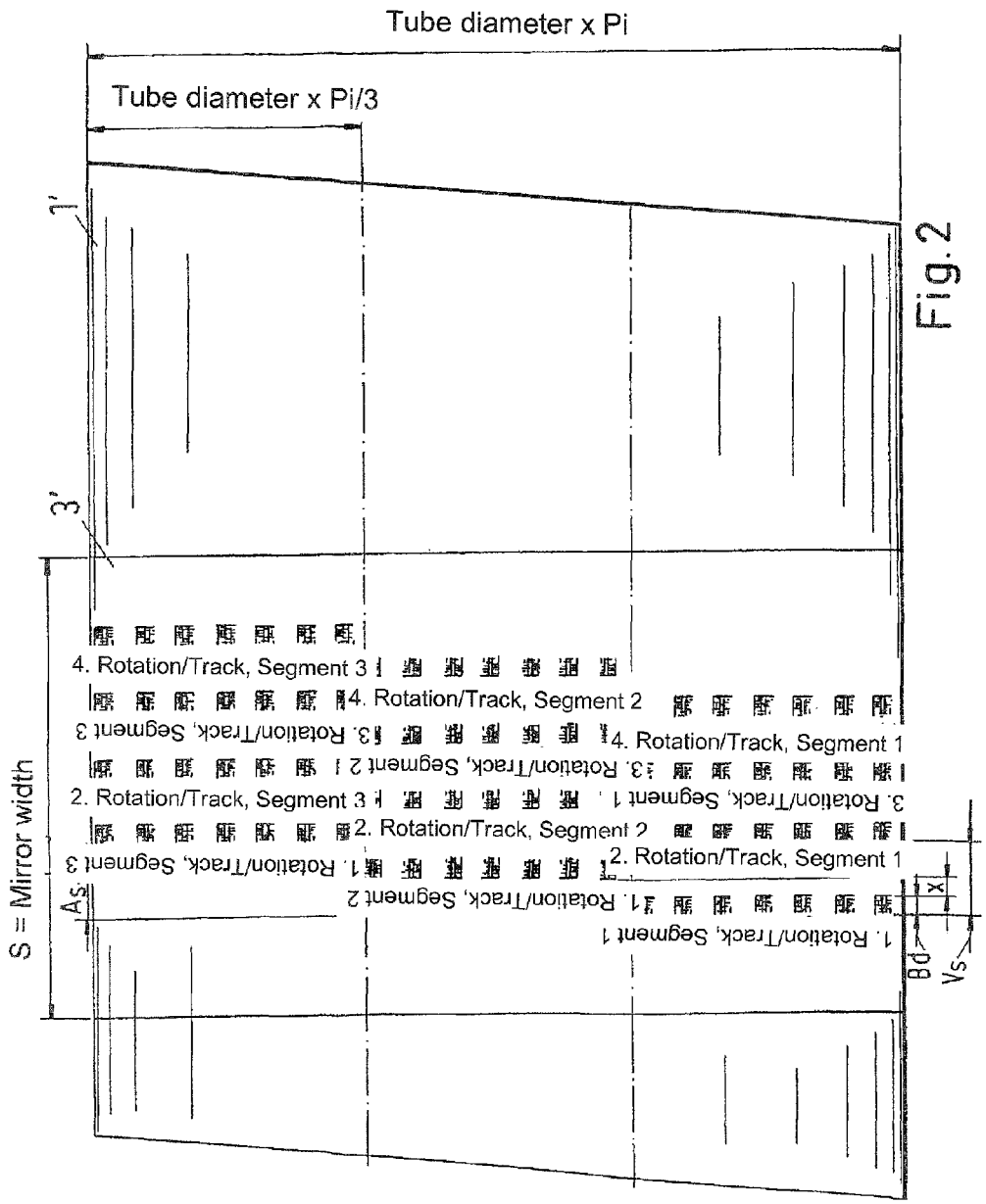

METHOD FOR INDIVIDUAL TRACKING OF METALLIC HOLLOW BODIES

CROSS-REFERENCES TO RELATED APPLICATIONS

This application is the U.S. National Stage of International Application No. PCT/DE2009/000866, filed Jun. 19, 2009, which designated the United States and has been published as International Publication No. WO 2009/155901 and which claims the priority of German Patent Application, Serial No. 10 2008 030 183.3, filed Jun. 26, 2008, pursuant to 35 U.S.C. 119(a)-(d).

BACKGROUND OF THE INVENTION

The invention relates to a method for individual tracking of metallic hollow bodies, in particular of hot-formed steel tube.

In the context of optimizing quality assurance and the costs in the production process when finishing hot-formed types, backtracking of the finished product, i.e., when and where something was manufactured, is highly important.

Closely related thereto is the unique identification of each individual tube during passage through all required manufacturing and test steps. In particular in areas with a typical mass production, for example in a tube plant where hundreds or thousands of individual tubes are simultaneously transported, machined and tested, individual tracking is a central topic.

In the past, several methods have been used for identifying each individual piece in a process akin to tracking; however, such approach no longer meets today's requirements.

For example, in many situations the rolling or manufacturing batch is selected as the smallest identifiable unit, wherein typically the same melt or the same final dimension forms a batch.

The number of pieces in a batch is initially ether determined manually or with a counting device, and the failure of one or several pieces is recorded during passage through the individual stations With larger batches, the batch is further subdivided into bundles, wherein each bundle receives a running number. The individual pieces are identified via the bundles which are mostly held together with wires, or via the batch, for example by inserting an identification card into one of the tubes with a bent wire.

Because the bundles are sometimes transported across several assembly halls, one cannot prevent that identification cards are lost or misplaced when the bundles are opened, or are mistakenly inserted into the wrong bundles.

Other systems operate with identification numbers which are either painted by hand or marked with a machine, with adhesively applied or stamped markings, or identifications engraved with lasers.

All these conventional processes have disadvantages, because the respective applied identification is either not always readable, for example the markings is located at the bottom side of the tube or the applied identification interferes with a test, for example because it causes erroneous indications in a US-test or the identification number is no longer readable due to an excessive transport speed of the tubes, or the measurement during the passage through all required manufacturing and test steps is not reliable.

DE 195 05 513 C2 discloses a method where a respective barcode with color markings is applied directly on each individual workpiece, in particular extending across the entire transverse tube circumference. The barcode can then be read independent of the circumferential position of the tube. The barcode is acquired with a video image so that the measurement is also independent of the transport direction.

This conventional method for individual tracking has several disadvantages. Because the tubes are handled when they pass through the individual manufacturing and test devices as well as when they are rolled on the roller table, the barcode applied with color markings can be damaged, thereby making it more difficult or even impossible to measure the identification optically.

For a reliable optical measurement of the barcode, the bar markings must not be selected to be too small depending on the surface quality and due to the roller-induced surface of the tubes, because frayed areas can be expected which the evaluation system is unable to distinguish as separate color bars. This necessitates an axial extent of the barcode of up to 500 mm, which is frequently rejected by customers for visual appearance reasons.

A generic method is disclosed in DE 10 2004 051 124 B3. In this method, the individual tube is provided with a unique identification extending about the entire tube circumference following a last hot-working step and automatically read as a video image in the feed region during the onward transport to the downstream processing and test stations independent of the transport direction. The unique identification is hereby applied as the data-matrix-code with multiple identical repetitions on the tube circumference.

The data-matrix-codes are here applied as a single track or as several tracks in a circular or helical manner in one or more revolutions of the tube.

The individual tracking of tubes marked with data-matrix-codes has been extremely successful in practice; however, it has been observed that markings in form of annual segments or markings in form of a helix applied continuously around the tube have several disadvantages.

With rolling tables that prevent rotation of the tube, the marking device must rotate completely about the tube in order to enable application of a marking around the entire circumference. This is quite complex as far as the supply of current via sliding contacts and the routing of cables or hoses of the marking device are concerned.

In a closed marking which extends around the tube in a circle, the track at the beginning and the end regions is frequently radially overwritten, preventing the code to be read.

It is an object of the invention to improve the conventional methods for individual tracking of hot-worked tubes so that even with roller tables that do not permit rotation of the tube, marking with a unique identification in form of a data-matrix-code which repeats identically multiple times on the tube circumference is possible in a simple and cost-effective manner and that the track having a circular arrangement can be reliably prevented from being overwritten.

SUMMARY OF THE INVENTION

According to the invention, the object is solved in that the tube circumference is marked in at least two segments dividing the tube circumference, wherein the marking is applied segment-wise by rotating the marking device by less than 360° and the segments have an axial offset relative to the longitudinal tube axis which is greater than the width of the data-matrix-code.

Unlike the method known from DE 10 2004 051 124 B3, the identification is no longer applied on the tube in form of a closed circular track, but the circle is subdivided into individual segments, wherein marking is applied by rotating the marking device segment-wise with a rotation of less than 360°, wherein the segments have a mutual axial offset which is greater than the width of the data-matrix-code. This axial offset is important for preventing overwriting when the individual segments are applied in the radial direction.

With a circular arrangement having two segments, these segments are preferably applied as circular arcs, with each arc extending over at least 180°. These circular art segments can also be greater than 180°, because the axial offset of the segments on the tube prevents overwriting.

In a first embodiment, when using only a single marking head, the rotation direction of the marking device is changed after the first segment is applied, whereafter the second segment is supplied.

In this embodiment, the first 180° segment is initially applied on the tube, whereafter the rotation direction of the marking device is changed and the second 180° segment is applied on the tube with an axial offset so as to produce a marking over the full circumference.

Advantageously, by changing the rotation direction, a complete rotation of the marking device about the tube with the aforedescribed disadvantages is prevented; on the other hand, with an axial offset, complete circular marking of the tube is attained while simultaneously preventing overwriting of the identifications in the radial direction.

In an advantageous embodiment of the invention, the tube circumference is marked not only with a single marking head, but with several marking heads simultaneously. This has the advantage of a significantly faster marking, if several circular markings of the data-matrix-code are to be applied along the tube circumference.

Advantageously, the marking heads in this embodiment are arranged about the tube in such a way that the number of segments are generated correspond to the division of the tube circumference and thus to the number of marking heads. For example, when using three marking heads, the marking heads are advantageously each positioned about the tube in the marking device with a corresponding circular division of 120° and with a mutual axial spacing, so that the entire tube circumference can be marked by rotating the marking device by 120°. Corresponding circular divisions can be derived for four or more marking heads. In general, the circular divisions can be freely selected corresponding to the operational requirements.

If additional markings in form of ring segments are to be applied, then these markings can be applied together with the first markings, if a corresponding number of marking heads with an axial offset is also arranged in the marking device. It is then possible to simultaneously apply, with a single rotation of the marking device commensurate with the circular division, the marking over the entire circumference as well as in the predetermined number along the length of the tube.

To limit the complexity for the construction of marking device, the additional arrangements in form of ring segments can also be applied on the tube sequentially. In this situation, the marking device is either advanced above the tube in the axial direction or the tube is advanced in the axial direction underneath the marking device, until the axial spacing from one segment to the adjacent segment is greater than the width of the data-matrix-code in order to also reliably prevent overwriting in the axial direction.

Additional features, advantages and details of the invention are described in the following description.

BRIEF DESCRIPTION OF THE DRAWING

It is shown in.

DETAILED DESCRIPTION OF PREFERRED EMBODIMENTS

Figure 1:
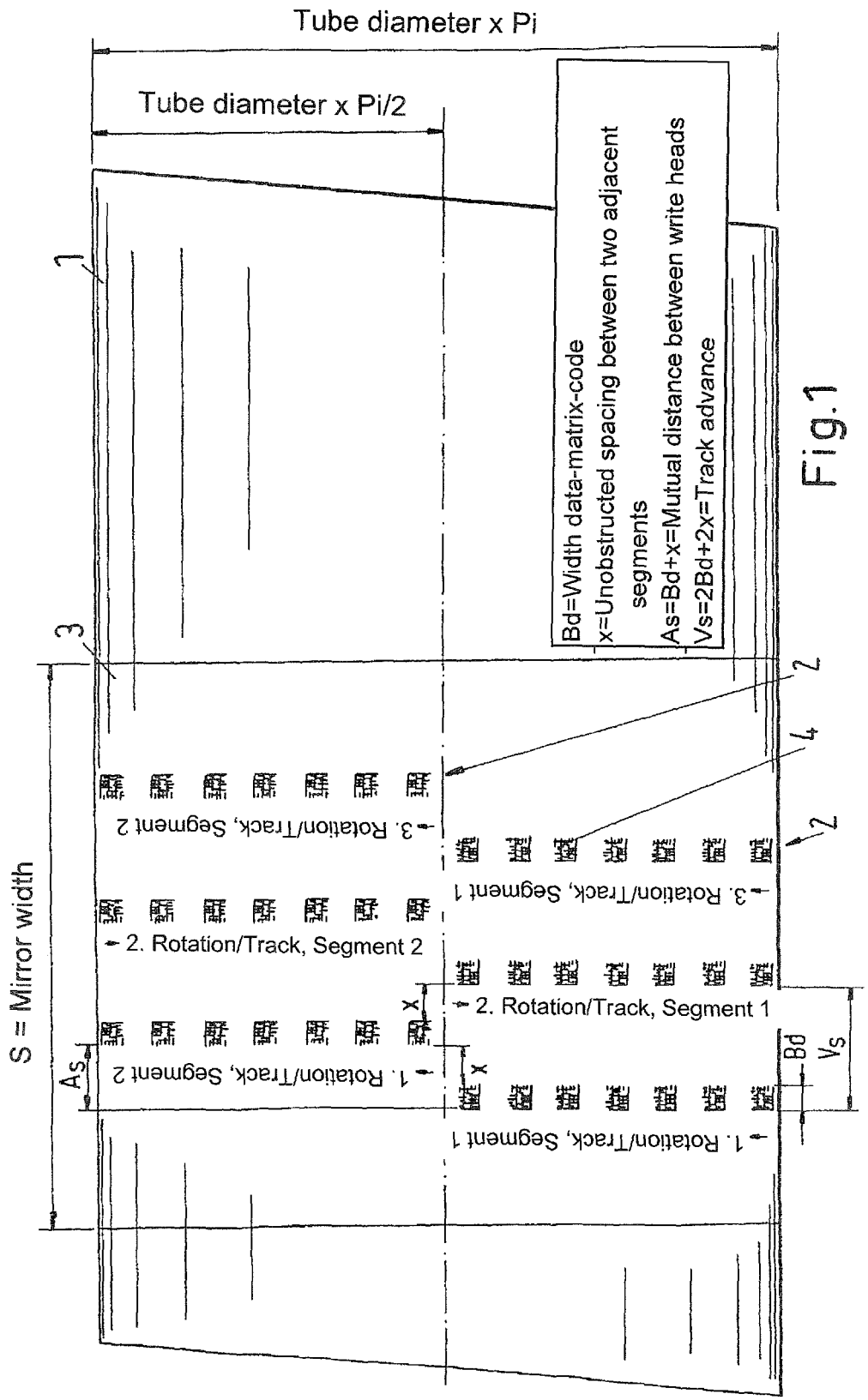
FIG. 1 a schematic diagram of the method of the invention with a marking of the tube circumference with two segments, FIG. 2 as FIG. 1, however with a marking of the tube circumference with three segments.

FIG. 1 shows a schematic diagram of the method of the invention with marking of the tube circumference with two segments. Shown is a flat protection of the circumference of a tube 1, wherein the tube circumference is marked with data-matrix-codes 4 having two axially offset segments 2, each extending over 180°.

1. Description of a First Embodiment of the Marking Device According to FIG. 1

The marking device used for carrying out the method of the invention according to FIG. 1 can be described as follows, wherein features of the apparatus are not illustrated and can be changed depending on the operational requirements.

a. The tube 1 to be marked rests on a roller table.
b. A motor-driven rotating bearing with the marking device is arranged around the tube 1, with the center of the marking device arranged above the height adjusting device of the center position of the tube. The rotating bearing may also be displaceable along the tube axis with a length adjustment device.
c. Two spray pistols for applying a reflective paint required for providing contrast of the marking relative to the background are arranged on the circumference of the rotating bearing, wherein the spray pistols for applying the paint reflector 3 are arranged in opposition with an offset of 180°.
d. Two marking heads (e.g., continuous inkjet or laser) for writing the data-matrix-code 4 are arranged on the circumference of the rotating bearing, wherein the marking heads are arranged along the longitudinal axis of the tube with an offset of 180° and with a spacing $A_s$ ($A_s$=Bd+x, with Bd=width data-matrix-code and x=relative distance between the marking heads). The distance x is adjusted depending on the requirements, but is always greater than zero.
e. Both the spray pistols and the marking heads are attached on the rotating bearing by way of an adjusting device which is movable perpendicular to the tube diameter, so as to guarantee a defined distance to the tube surface for different diameters.

The process flow for marking the tube 1 according to FIG. 1 with the method according to the invention can essentially be described as follows:

2. Carrying Out the Marking According to FIG. 1
a.) When the spray pistols are turned on, the (unillustrated) rotating bearing rotates in one direction for applying the paint reflector 3. When reaching about +180°, the spray pistols are turned off, producing a closed paint reflector 3 about the entire tube circumference with a width S that depends on the spray angle of the pistols.
b.) The marking heads start the marking with the data-matrix-code 4 at the beginning of the respective paint reflector 3. After reaching an angle greater than/equal to +180°, the rotation of the rotating bearing as well as the marking with the marking heads stop. The tube hereby receives a circular marking composed of the data-matrix-code along the entire circumference, consisting of two axially offset segments.
c.) If an additional circular marking is to be applied, the entire rotating bearing moves by way of its longitudinal adjusting device (track advance) by a value $V_s$ (with $V_s=2\times Bd+2\cdot x$) and thereafter begins marking in the reverse rotation direction until reaching an angle less than/equal to 0°.

d.) For additional circular markings, a movement is performed in analogy to c) with alternating rotation directions.

e.) When the end of the reflector has been reached, a movement is performed in analogy to steps a) to c), or the marking process is terminated.

FIG. 2 shows in an additional embodiment the marking of a tube 1', wherein the tube circumference is marked with three axially offset segments 2 extending each over 120°.

2. Carrying Out the Marking According to FIG. 2 a.) As 2 a)

b.) As 2 b)

c.) In this embodiment, three spray pistols for applying the reflector paint are arranged along the circumference of the rotating bearing, wherein the axially offset spray pistols for applying the paint reflector 3' are arranged along the tube circumference with a mutual offset of 120°.

d.) Likewise, three marking heads (e.g., continuous inkjet or laser) for writing the data-matrix-code 4 are likewise arranged on the circumference of the rotating bearing, wherein the marking heads are arranged along the longitudinal axis 1' of the tube with a mutual offset of 120° and with a spacing $A_s$.

e.) Both the spray pistols and the marking heads are attached on the rotating bearing by way of an adjusting device which operates in the radial direction of the tube, so as to guarantee a defined distance to the tube surface for different diameters.

The number of the spray pistols/marking heads and/or the variants can be adapted or combined commensurate with the operational requirements, e.g., with the cycle time and the maintenance requirements.

The advantages of the invention will now be summarized again:

The marking heads always rotate within ±360°. Therefore, no sliding contacts are required, and no lines get entangled (Paint).

Overwriting of the tracks (segments) is prevented with offset tracks (segments).

Complete marking of the tube over the entire circumference.

Simple technical adaptation to the cycle times through simplification of the marking heads.

The invention claimed is:

1. A method for individual tracking of metallic tubular bodies, comprising the steps of:

applying with a marking device, which is rotatable about the tubular body and comprises at least one marking head, on a circumference of the tubular body a unique identification as data-matrix-code marker having at least two identically repeating segments dividing the circumference, wherein the marker is applied in each segment by a rotation of the marking device by less than 360° and the segments have an axial offset in a longitudinal tube axis of the tubular body which is greater than an axial width of the data-matrix-code automatically reading the unique identification as a video image in a feed region during onward transport of a tubular body to a downstream manufacturing and test stations independent of a transport direction, recording the identification of the individual tubular bodies when passing through the downstream manufacturing and test stations, comparing the recorded identification with previously inputted identifications, and associating a manufacturing or test step performed in the manufacturing and test stations with the recorded identification.

2. The method of claim 1, wherein when using a single marking head, the rotation direction of the marking device is changed after application of a first marker in the at least two identically repeating segments, whereafter a second marker is applied in the at least two identically repeating segments.

3. The method of claim 1, wherein when using two marking heads, the two marking heads are arranged with an axial offset and with an angular offset about the tube of 180° and the marking device is rotated by at least 180°.

4. The method of claim 1, wherein when using three marking heads, the three marking heads are arranged with an axial offset and with an angular offset about the tube of 120° and the marking device is rotated by at least 120°.

5. The method of claim 1, wherein when using four marking heads, the four marking heads are arranged with an axial offset and with an angular offset about the tube of 90° and the marking device is rotated by at least 90°.

6. The method of claim 1, wherein in conjunction with applying a first marker with data-matrix-code in the at least two identically repeating segments, additional markers in form of ring segments are applied on the tube with the axial offset in the longitudinal tube axis.

7. The method of claim 6, wherein the additional markers in form of ring segments are applied simultaneously with application of the first marker, by using a number of marking heads that corresponds to a number of circumferential ring segments and a number of markers in form of the ring segments.

8. The method of claim 6, wherein the additional markers in form of ring segments are applied consecutively following application of the first marker by holding the tubular body in a fixed position and displacing the marking device axially along the longitudinal tube axis above the fixedly positioned tubular body.

9. The method of claim 6, wherein the additional markers in form of ring segments are applied consecutively following application of the first marker by holding the marking device in a fixed position and displacing the tubular body axially along the longitudinal tube axis underneath the fixedly positioned marking device.

10. The method of claim 1, wherein the axial offset between the markers is greater than the axial width of the data-matrix-code.

11. The method of claim 6, wherein the axial offset is freely selectable and freely adjustable.

12. The method of claim 1, wherein the tubular body is hot-formed.

* * * * *